US009993900B2

(12) United States Patent
Hasegawa et al.

(10) Patent No.: US 9,993,900 B2
(45) Date of Patent: Jun. 12, 2018

(54) METHOD FOR POSITIONING WELDING CLAMP

(71) Applicant: HONDA MOTOR CO., LTD., Tokyo (JP)

(72) Inventors: Masahiro Hasegawa, Tochigi (JP); Susumu Yamashita, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 14/917,175

(22) PCT Filed: Sep. 17, 2014

(86) PCT No.: PCT/JP2014/074562
§ 371 (c)(1),
(2) Date: Mar. 7, 2016

(87) PCT Pub. No.: WO2015/041252
PCT Pub. Date: Mar. 26, 2015

(65) Prior Publication Data

US 2016/0193700 A1 Jul. 7, 2016

(30) Foreign Application Priority Data

Sep. 18, 2013 (JP) ................................ 2013-193402

(51) Int. Cl.
*B23K 37/00* (2006.01)
*B23K 37/04* (2006.01)
(Continued)

(52) U.S. Cl.
CPC .......... *B23K 37/047* (2013.01); *B23K 11/115* (2013.01); *B23K 31/02* (2013.01);
(Continued)

(58) Field of Classification Search
CPC ............ B23K 2201/006; B23K 26/037; B23K 37/0435
(Continued)

(56) References Cited

U.S. PATENT DOCUMENTS 5,901,426 A * 5/1999 Okazaki ............. B23K 37/0443 269/329
6,173,882 B1 1/2001 Booker et al.
6,295,715 B1 10/2001 Beyer

FOREIGN PATENT DOCUMENTS

JP 63-119987 5/1988
JP 09-182972 7/1997
(Continued)

OTHER PUBLICATIONS

International Search Report, dated Dec. 16, 2014 (Dec. 16, 2014).

*Primary Examiner* — Erin B Saad
(74) *Attorney, Agent, or Firm* — Rankin, Hill & Clark LLP

(57) ABSTRACT

A method for positioning a welding clamp includes: a first step of determining a reference clamp position on a first workpiece (STEP 2); a second step of determining a first workpiece state in welding and determining the presence or absence of a site having a deflection larger than a predetermined deflection amount in the first workpiece (STEPs 3 to 5); and a third step of, if the second step determines the presence, determining the site as an additional clamp position (STEP 6). The method suitably determines a limited number of clamp positions that cause no welding target workpiece deflection exceeding the predetermined deflection amount by repeating the second step and the third step until the second step determines the absence.

8 Claims, 6 Drawing Sheets

1 6 4 3 Fa Fa 7 12 10 2 13 11 Fa Fa 5

(51) Int. Cl.

| | |
|---|---|
| ***B23K 37/047*** | (2006.01) |
| ***B23K 11/11*** | (2006.01) |
| ***B23K 31/02*** | (2006.01) |
| *B23K 101/00* | (2006.01) |
| *B23K 101/18* | (2006.01) |

(52) U.S. Cl.
CPC .... *B23K 37/0435* (2013.01); *B23K 2201/006* (2013.01); *B23K 2201/18* (2013.01)

(58) Field of Classification Search
USPC .................................................. 228/102, 103
See application file for complete search history.

(56) References Cited

FOREIGN PATENT DOCUMENTS

| | | |
|---|---|---|
| JP | 09-183033 | 7/1997 |
| JP | 10-323795 | 12/1998 |

* cited by examiner

METHOD FOR POSITIONING WELDING CLAMP

TECHNICAL FIELD

The present invention relates to a method for positioning a welding clamp used to fasten welding target workpieces during the welding.

BACKGROUND ART

To improve the quality of workpieces welded, the following conventional method for joining workpieces has been known (Patent Literature 1). The method places two or more workpieces on a jig provided with a clamp unit, and joins the workpieces being clamped by the clamp unit for assembling a product. In this process, the method measures the amount of workpiece distortion occurring when the clamp unit clamps the workpieces, and on the basis of the measured distortion amount, calculates the workpiece correction amount required to leave no distortion after the joining of the workpieces together by welding. After the calculation, the clamp unit is moved, with the clamp position maintained, to deflect the workpieces by the correction amount at the clamp position before the welding.

CITATION LIST

Patent Literature

Patent Literature 1: Japanese Patent Laid-Open No. 9-182972

SUMMARY OF INVENTION

Technical Problem

The above-described conventional method is not intended to determine the suitable clamp position of welding target workpieces. The method clamps welding target workpieces at a determined clamp position, and removes a distortion that occurs in the welding.

For example, a large and heavy welding target workpiece such as a car body requires multiple clamp positions to be set. However, an unsuitable clamp position may cause a distortion amount at a workpiece site distant from the clamp position to exceed the tolerable level. Such a site exceeding the tolerable level of a distortion amount may lower the accuracy of a welding position.

An object of the present invention is to provide a method for positioning a welding clamp, the method capable of suitably determining a limited number of clamp positions that cause no welding target workpiece deflection exceeding a predetermined deflection amount.

Solution to Problem

The present invention is a method for positioning a welding clamp to determine positions for clamping a welding target first workpiece by the welding clamp, and the method includes:

a first step of determining a reference clamp position on the first workpiece;

a second step of, on a condition that the first workpiece welded on the determined clamp position, determining a presence or absence of a site having a deflection larger than a predetermined deflection amount in the first workpiece; and a third step of, if the second step determines the presence of a site having a deflection larger than the predetermined deflection amount, determining the site as an additional clamp position.

In this method, a clamp position determined by repeating the second step and the third step is determined as a clamp position of the first workpiece for the welding clamp until the second step determines the absence of a site having a deflection larger than the predetermined deflection amount.

According to the present invention, a clamp position on first workpiece is determined by repeating the second step and the third step of adding a clamp position until the second step determines the absence of a site having a deflection larger than the predetermined deflection amount. As a result, when the welding clamp clamps the first workpiece at the determined clamp positions, the deflection of each site of the first workpiece is controlled to a predetermined deflection amount or lower. If there is a site with a deflection exceeding the predetermined deflection amount, a clamp position is added to this site. The addition of clamp positions is ended once every site with a deflection exceeding the predetermined deflection amount is eliminated, and thus the number of clamp positions added is controlled. This allows the control of the total number of clamp positions.

Preferably, in the method for positioning a welding clamp according to the present invention, the second step determines the presence or absence of a site having a deflection larger than the predetermined deflection amount in the first workpiece based on whether a maximum deflection amount in the first workpiece exceeds the predetermined deflection amount, and the third step determines a site having the maximum deflection amount in the first workpiece as an additional clamp position.

This configuration allows a reduction in the number of repetitions of the second step and the third step, resulting in a shorter time required for positioning the welding clamp because a site having the maximum deflection amount is determined as an additional clamp position in each third step during the repetitions of the second step and the third step.

Preferably, in the method for positioning a welding clamp according to the present invention, if the site having the maximum deflection amount in the first workpiece is a site incapable of being clamped by the welding clamp, the third step determines, as an additional clamp position, a site including, when distortions in the first workpiece are classified by areas in accordance with distortion amounts, the same area as the site with the maximum deflection amount, and capable of being clamped by the welding clamp in the area.

This configuration allows the smooth determination of a crank site that can control the deflection of each site in the first workpiece to be equal to or lower than a tolerable level even if the first workpiece has a site incapable of being clamped by the welding clamp.

Preferably, in the method for positioning a welding clamp according to the present invention, if there is a site having a deflection amount larger than the predetermined deflection amount, being other than the site with the maximum deflection amount, and having a maximal deflection amount larger than surrounding deflections, the third step determines the site with the maximal deflection amount and the site with the maximum deflection amount as additional clamp positions.

This configuration allows a reduction in a time required until the second step determines the absence of a site with a deflection larger than the predetermined deflection amount, by determining multiple sites as additional clamp positions at a time.

Preferably, the method for positioning a welding clamp according to the present invention includes:

a fourth step of, when a second workpiece to be welded onto the first workpiece is placed after the determination of the clamp positions on the first workpiece, determining settings with buckling due to a placement load in a direction of placing the second workpiece onto the first workpiece, and on a condition that the first workpiece welded on the determined clamp position, determining the presence or absence of a site having a deflection larger than the predetermined deflection amount, and a fifth step of, if the fourth step determines the presence of a site having a deflection larger than the predetermined deflection amount, determining the site as an additional clamp position.

In the method, a clamp position determined by repeating the fourth step and the fifth step is determined as a clamp position of the first workpiece for the welding clamp until the fourth step determines the absence of a site having a deflection larger than the predetermined deflection amount.

In this configuration, a clamp position on the first workpiece is determined by repealing the fourth step and the fifth step of adding a clamp position until the fourth step determines the absence of a site having a deflection larger than the predetermined deflection amount. As a result, when the welding clamp clamps the first workpiece at the determined clamp positions, the deflection of each site of the first workpiece is controlled to a predetermined deflection amount or lower. If there is a site with a deflection exceeding the predetermined deflection amount, a clamp position is added to this site. The addition of clamp positions is ended once every site with a deflection exceeding the predetermined deflection amount is eliminated, and thus the number of clamp positions added is controlled. This allows the control of the total number of clamp positions.

Preferably, in the method for positioning a welding clamp according to the present invention, the fourth step determines the presence or absence of a site having a deflection larger than the predetermined deflection amount in the first workpiece based on whether a maximum deflection amount in the first workpiece exceeds the predetermined deflection amount, and the fifth step determines a site having the maximum deflection amount in the first workpiece as an additional clamp position.

This configuration allows a reduction in the number of repetitions of the fourth step and the fifth step, resulting in a shorter time required for positioning the welding clamp because a site having the maximum deflection amount is determined as an additional clamp position in each fourth step during the repetitions of the fourth step and the fifth step.

Preferably, in the method for positioning a welding clamp according to the present invention, if the site having the maximum deflection amount in the first workpiece is a site incapable of being clamped by the welding clamp, the fifth step determines, as an additional clamp position, a site including, when distortions in the first workpiece are classified by areas in accordance with distortion amounts, the same area as the site with the maximum deflection amount, and capable of being clamped by the welding clamp in the area.

This configuration allows the smooth determination of a crank site that can control the deflection of each site in the first workpiece to be equal to or lower than a tolerable level even if the first workpiece has a site incapable of being clamped by the welding clamp.

Preferably, in the method for positioning a welding clamp according to the present invention, if there is a site having a deflection amount larger than the predetermined deflection amount, being other than the site with the maximum deflection amount, and having a maximal deflection amount larger than surrounding deflections, the fifth step determines the site with the maximal deflection amount and the site with the maximum deflection amount as additional clamp positions.

This configuration allows a reduction in a time required until the fourth step determines the absence of a site with a deflection larger than the predetermined deflection amount, by determining multiple sites as additional clamp positions at a time.

DESCRIPTION OF EMBODIMENTS

Figure 1:
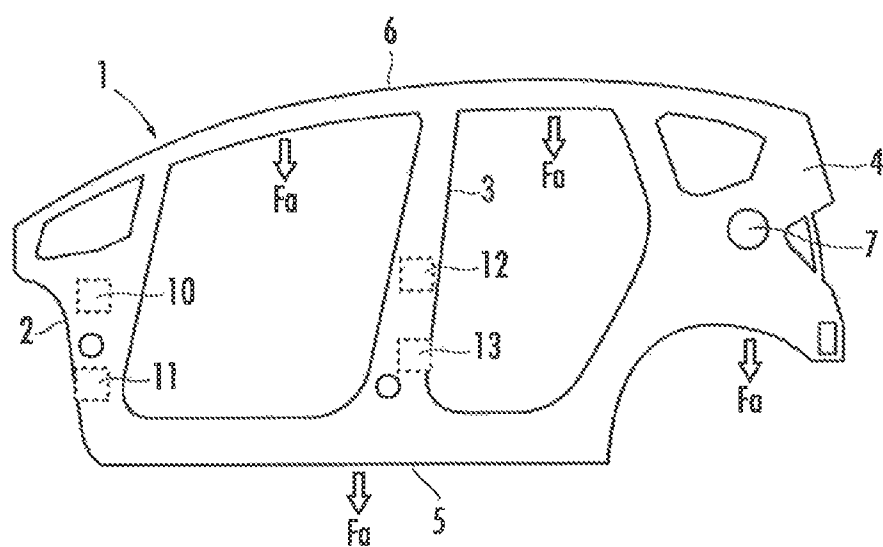
FIG. 1 is a side view of a car body side that is a welding target workpiece having hinge areas as base clamp positions.

FIG. 1 is a side view of a car body side 1 that is a welding target workpiece. The car body side 1 includes a front protrusion 2, a central pillar 3, a rear protrusion 4, a floor 5, and a roof 6. The car body side 1 is a structure formed as a plate. The illustrated car body side 1 represents the left side of the vehicle.

The car body side 1 has holes for mounting doors and glasses, and additionally small holes such as a through-hole 7 as needed. The through-hole 7 is provided only in the left side of the vehicle as a hole in which, at a gas station, the tip of a fuel service nozzle is inserted. In other words, such a hole is not provided in the right side of the car body.

A front upper hinge area 10 and a front lower hinge area 11 are positions for the hinges that pivotally couple the front end of a front door (not shown) to the car body side 1. A rear upper hinge area 12 and a rear lower hinge area 13 are positions for hinges that pivotally couple the front end of a rear door (not shown) to the car body side 1.

The car body side 1 in welding (more specifically, spot welding) is clamped at a predetermined clamp position by a welding clamp, which is a sandwiching tool, and held in a posture with the up-and-down and right-and-left directions of FIG. 1 respectively as the vertical and horizontal directions. The front upper hinge area 10, the front lower hinge area 11, the rear upper hinge area 12, and the rear lower hinge area 13 are four base clamp positions (reference clamp positions) in welding, described later.

The car body side 1 is large and heavy, and accordingly the self-weight Fa of each site of the car body side 1 acts in a vertically downward direction depending on its own site. When the car body side 1 in welding is sandwiched and supported only on the base clamp positions by the welding clamp, the vertical deflection amount of a certain site in the car body side 1 exceeds the tolerable level due to its self-weight Fa. The car body side 1 is to be spot-welded by a welding robot at multiple predetermined welding positions. Thus, a site in the car body side 1 with a deflection amount exceeding the tolerable level may cause the accuracy of the welding positions to be beyond a permissible range.

In welding of the car body side 1, clomping by the welding clamp only at the base clamp positions is thus insufficient. In addition to the base clamp positions, an appropriate number of predetermined clamp positions are necessarily provided to support the car body side 1 for controlling a deflection amount of each site of the car body side 1 to a value equal to or lower than the tolerable level.

The car body side 1 is formed of substantially homogeneous metal such as a steel sheet, and thus when each site of the car body side 1 is defined by three-dimensional coordinates, the density of each site of the car body side 1 is substantially even. In contrast, the thickness of the car body side 1 structurally varies depending on the site of the surface of the car body side 1, and thus when each site of the car body side 1 is defined by two-dimensional coordinates, the density of each site of the car body side 1 has a value depending on its own thickness.

In the computer simulation described later for the deflection amount of each site in the self-weight direction (vertical direction), each site of the car body side 1 may be defined by three-dimensional coordinates or by the two-dimensional coordinate plane along the car body side 1. In the latter case, the computer simulation is performed with the density of each site that is based on three-dimensional coordinates being converted into the density of each site based on the two-dimensional coordinate plane.

The self-weight Fa is defined as the weight of each site of the car body side 1 undergoing an acceleration of 1 G (G denotes gravitational acceleration). In welding of the car body side 1, a site that is not clamped by the welding clamp in the car body side 1 thus deflects downward (or is displaced downward from its normal position) by a total deflection from clamp positions to this site due to the self-weight Fa. If the deflection in the entire car body side 1 is equal to or lower than the tolerable level, no problem arises. However, any site having a deflection exceeding the tolerable level may cause the accuracy of welding positions to be beyond a permissible range.

Figure 2:
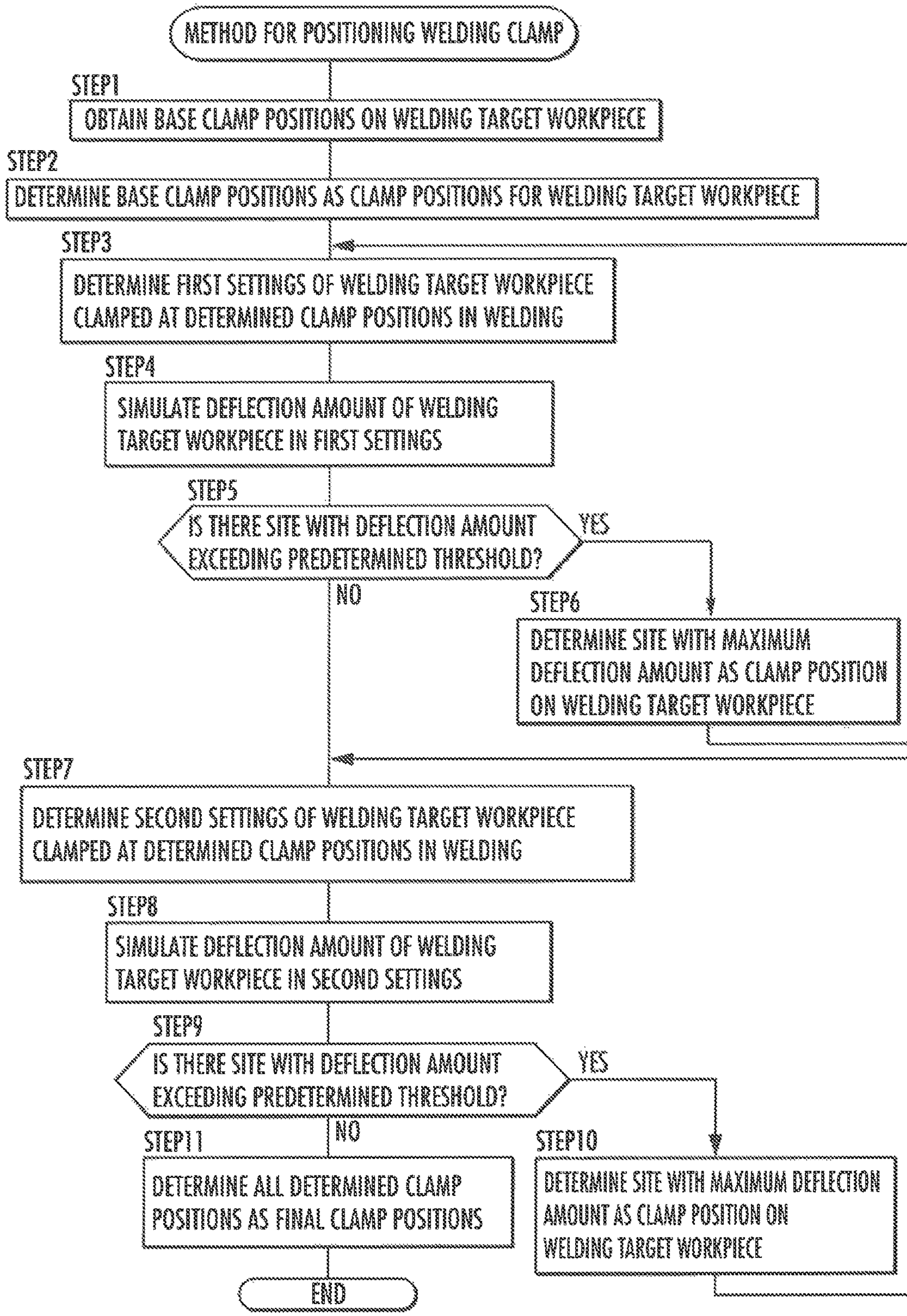
FIG. 2 is a flow chart of a method for positioning a welding clamp.

FIG. 2 is a flow chart of a method for positioning a welding clamp, that is, a method for positioning the welding clamp for the car body side 1 (a method for determining clamp positions when the welding clamp clamps the welding target workpiece). The method for positioning a welding clamp is performed by a predetermined operator using predetermined simulation software installed in a personal computer (PC; hereinafter, referred to as "simulation PC").

In the flow chart of FIG. 2, STEP 4 and STEP 8 are performed by the simulation PC, and the other STEPs are performed in response to an operation by the operator such as inputs or instructions to the simulation PC. Among a variety of settings in STEP 3 and STEP 7, the posture of the welding target workpiece in welding is determined only once by the operator prior to the start of the method for positioning a welding clamp in FIG. 2, and a determination in each of STEP 3 and STEP 7 is omitted.

In the flow chart of FIG. 2, the welding target workpiece is the car body side 1 that is a first workpiece. A welded workpiece described later is a rigid (stiff) member 40 (see FIG. 5), and this member is horizontally brought into contact with the inside of the car body side 1 and welded onto the car body side 1 to reinforce the car body side 1.

The flow chart in FIG. 2 falls into the first half of determining clamp positions in STEPs 1 to 6, and the second half of determining clamp positions in STEPs 7 to 10 after the determination of the clamp positions in the first half. The first half determines clamp positions of the car body side 1 that is a single workpiece to be clamped. The second half determines clamp positions with the rigid member 40 assumed to be joined to the car body side 1 by welding.

In STEP 1, the operator obtains base clamp positions on the welding target workpiece. In this example, the base clamp positions are the hinge areas 10 to 13 (FIG. 1), which are four positions in total.

The base clamp positions are determined as clamp positions that allow the welding target workpiece to be supported in a predetermined posture when the welding target workpiece is clamped only at the base clamp positions regardless of whether the deflection amount of the entire car body side 1 is equal to or lower than a tolerable deflection level. The welding target workpiece is designed in advance to have the base clamp positions instead of selecting the base clamp positions after the welding target workpiece is designed.

In STEP 2, the operator determines the base clamp positions as clamp positions for the welding target workpiece.

In STEP 3, the operator determines first settings of the welding target workpiece clamped at the determined clamp positions in welding. The first settings and second settings described later are similar in that the welding target workpiece is clamped by the welding clamp at the determined clamp positions. However, in the first settings, a target, the weight and posture of which are supported and maintained by the welding clamp, is only the welding target workpiece as the first workpiece, while in the second settings, the target includes the welding target workpiece as the first workpiece and the rigid member 40 (see FIG. 5) as a second workpiece.

Figure 6:
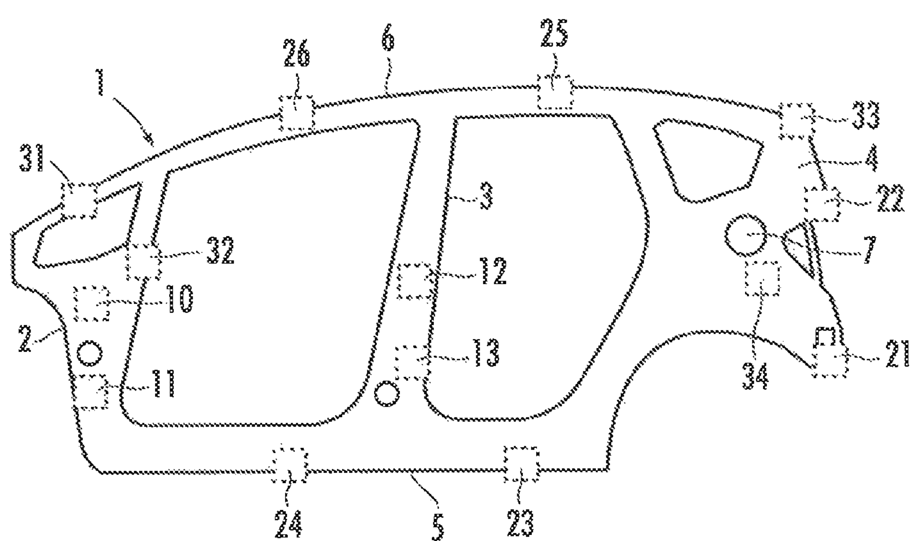
FIG. 6 illustrates clamp positions finally determined with the influence of buckling eliminated.

In both of the first and second settings of an embodiment, the car body side 1 that is the welding target workpiece stands upright, for example, as illustrated in FIG. 1 and FIG. 6. In some welding environment, the posture of the car body side 1 that is the welding target workpiece in welding is inclined at a predetermined angle to the horizontal plane instead of being in the upright posture illustrated in FIG. 1. In this case, the postures of the car body side 1 determined in the first and second settings are also changed.

In STEP 4, the simulation PC simulates the deflection amount of each site of the welding target workpiece in the first settings. In STEP 5, the operator determines whether the welding target workpiece has a site with a deflection amount exceeding a predetermined threshold, on the basis of the simulation results from STEP 4. Although the predetermined threshold is typically set at the tolerable deflection level of the welding target workpiece, the threshold may also be set at a predetermined value greater than the tolerable level.

If the determination result in STEP 5 is yes (the determination of the presence of a site with a deflection amount exceeding the tolerable level), the operator proceeds to STEP 6. If the determination result is no (the determination of the absence of a site with a deflection amount exceeding the tolerable level), the operator proceeds to STEP 7.

In STEP 6, the operator determines a site with the maximum deflection amount in the welding target workpiece as a clamp position on the welding target workpiece. After STEP 6, the operator returns to STEP 3, and repeats STEPs 3 to 6 until the determination result in STEP 5 becomes no. The site with the maximum deflection amount in the welding target workpiece may be difficult to be clamped by a robot for some reasons of the three-dimensional structure of the welding target workpiece. In such a case, the operator shifts the determined clamp position from the site with the maximum deflection amount. For example, the operator chooses the site closest to the site with the maximum deflection amount from the sites of the welding target workpiece that can be clamped by the welding clamp, and determines the chosen site as a clamp position.

The specific situation in which determined clamp positions are added to the car body side 1 one after another in response to the repetition of STEPs 3 to 6 will be described with reference to FIG. 3A, FIG. 3B, FIG. 3C, FIG. 3D, FIG. 4A, FIG. 4B, and FIG. 4C. The determined clamp positions are added in the order of FIG. 3A, FIG. 3B, FIG. 3C, FIG. 3D, FIG. 4A, FIG. 4B, and FIG. 4C. At the situation of FIG. 4C, the determination result in STEP 5 becomes no, and the repetition processing of STEPs 3 to 6 is ended.

FIG. 3A, FIG. 3B, FIG. 3C, FIG. 3D, FIG. 4A, FIG. 4B, and FIG. 4C correspond to the pictures on the display of the simulation PC that displays the computer simulation results of the deflections. The actual pictures represent areas of the car body side 1 with different colors depending on the amounts of the deflections. For classification by colors, warmer colors are assigned to areas with larger deflection amounts, and colors assigned to areas become colder with the decreasing deflection amounts, in the order of red, orange, yellow, . . . , and blue. For example, when colors are assigned to the areas of sites with deflection amounts exceeding the threshold, the picture represents a site with a deflection amount considerably exceeding the threshold as a red area, and a site with a deflection amount slightly exceeding the threshold as an orange area.

The picture representing areas having different deflection amounts in the car body side 1 with different colors allows the operator to suitably chose the site closest to the site with the maximum deflection amount from the sites of the welding target workpiece that can be clamped by the welding clamp, and determine the chosen site as a clamp position. This is because the site with the maximum deflection amount among the sites of the welding target workpiece that can be clamped by the welding clamp is within the color area including the site with the maximum deflection amount in the entire car body side 1.

The site with the maximum deflection amount in the entire car body side 1 may be adjacent to the edge of this color area, instead of at the center of this color area. If areas are not classified with colors, the operator may erroneously choose a site close to the site with the maximum deflection amount in the entire car body side 1 and other than the site with the maximum deflection amount among the sites that can be clamped, and determine the chosen site as a clamp position that would be the site with the maximum deflection amount among the sites that can be clamped. Classifying areas with colors is useful in preventing the determination of the erroneous clamp position.

The picture also indicates the site with the maximum deflection amount in the car body side 1, for example, using an icon with a value of the deflection amount. In FIG. 3A, FIG. 3B, FIG. 3C, FIG. 3D, FIG. 4A, and FIG. 4B, a sign Wa boxes sites with the maximum deflection amounts that are larger than the threshold in each simulation. A sign Wb in FIG. 4C boxes a site with the maximum deflection amount that is equal to or lower than the threshold.

Figure 3A:
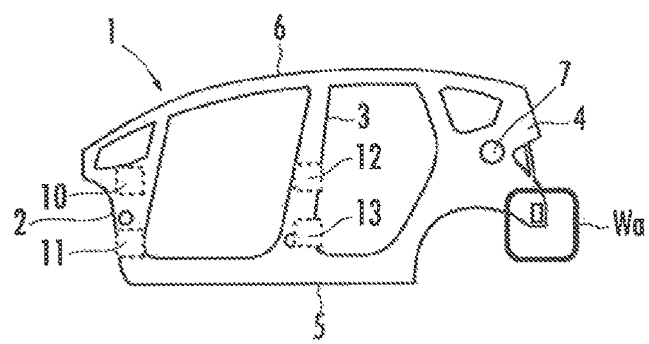
FIG. 3A, FIG. 3B, FIG. 3C and FIG. 3D illustrate the first half of the process for determining clamp positions one after another on a single welding target workpiece in accordance with the process procedure in FIG. 2.

FIG. 3A illustrates determined clamp positions and computational results from the first computer simulation. When the first computer simulation is performed, only four areas of the hinge areas 10 to 13 are determined as clamp positions. In this case, the sign Wa appears at the lower end of a rear edge of the rear protrusion 4. The operator adds a clamp position 21 (FIG. 3B) to the position of the sign Wa as a determined clamp position.

Figure 3B:
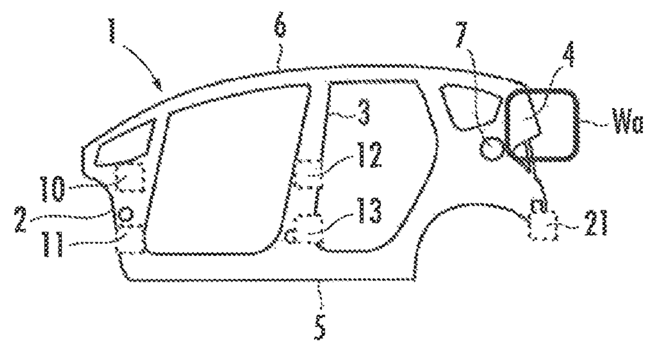
Figure 3C:
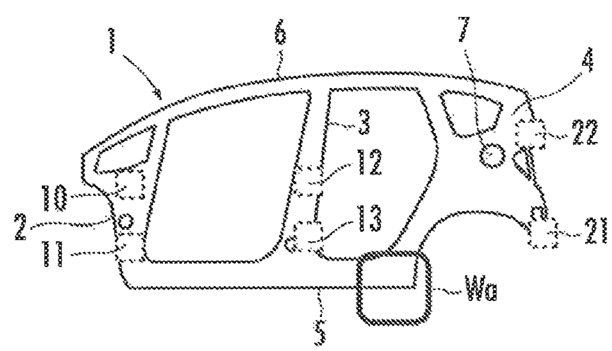
Figure 3D:
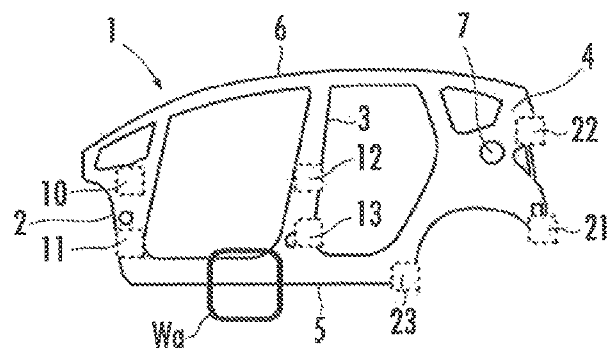

FIG. 3B illustrates the determined clamp positions and computational results from the second computer simulation. The second computer simulation is performed with five areas of the hinge areas 10 to 13 and the clamp position 21 being determined as clamp positions. As a result of the second computer simulation, the sign Wa appears in the vicinity of the upper end of a rear cutout edge of the rear protrusion 4. The operator adds a clamp position 22 (FIG. 3C) to the position of the sign Wa as a determined clamp position.

In this manner, the operator repeats addition of a clamp position to a site with the maximum deflection amount, and simulations until the car body side 1 has no more sites having a deflection amount equal to or higher than the threshold. FIG. 3C, FIG. 3D, FIG. 4A, FIG. 4B, and FIG. 4C illustrate the sign Wa appearing and the process for adding clamp positions 23 to 26 one after another in the third or subsequent repeated computer simulations.

Figure 4A:
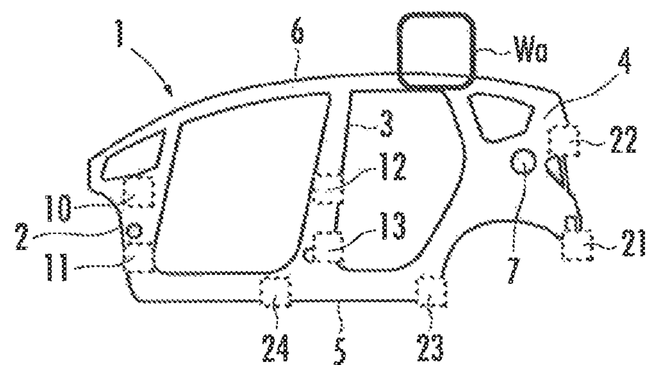
FIG. 4A, FIG. 4B, and FIG. 4C illustrate the second half of the process for determining the clamp position one after another on the single welding target workpiece in accordance with the process procedure in FIG. 2.
Figure 4B:
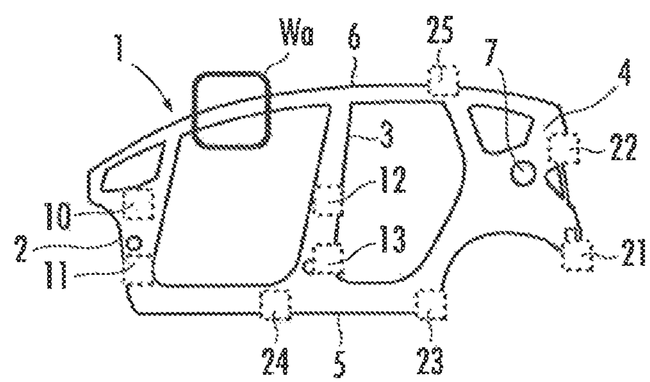
Figure 4C:
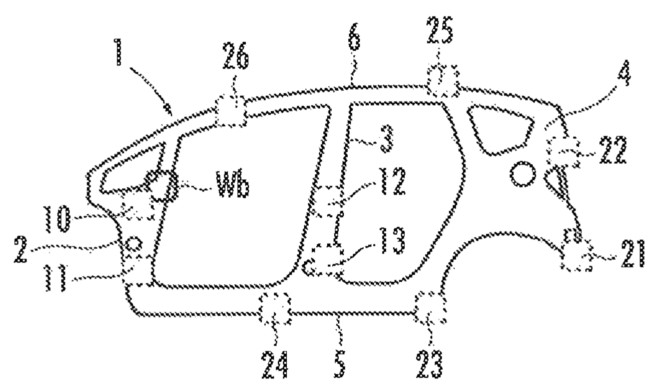

In FIG. 4C, the maximum deflection amount in the car body side 1 is equal to or lower than the threshold, and thus the site of the maximum deflection amount is not indicated by the sign Wa but by the sign Wb. In the state illustrated in FIG. 4C, the amounts of deflections at all sites of the car body side 1 are equal to or lower than the threshold. The operator recognizes the sign Wb and ends the operation of determining clamp positions.

As illustrated in FIG. 3A, FIG. 3B, FIG. 3C, FIG. 3D, FIG. 4A, FIG. 4B, and FIG. 4C, determined clamp positions of the car body side 1 that is a single workpiece to be clamped are added by repeating STEPs 3 to 6 until the determination result in STEP 5 becomes no, that is, the workpiece has no more sites having a deflection amount higher than the threshold, which is a tolerable level. This allows prevention of a site with a deflection amount higher than the threshold, in the car body side 1 that is a single workpiece to be clamped. When any site with a deflection amount higher than the threshold remains in the car body side 1, a clamp position is added sequentially to the site. If the determination result in STEP 5 becomes no, the addition of a determined clamp position is ended. This allows the number of determined clamp positions to be minimized.

Figure 5:
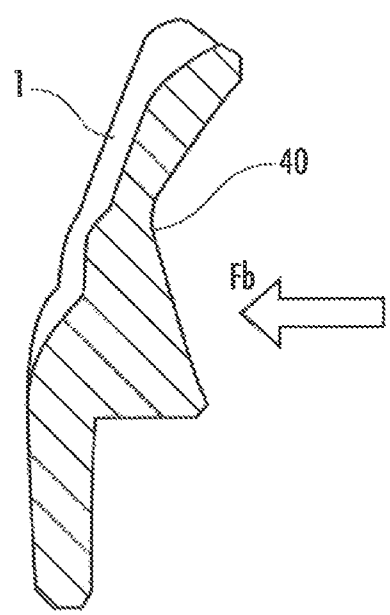
FIG. 5 illustrates the placement of a rigid member on the car body side.

Next, FIG. 5 illustrates welding a reinforcement rigid member 40 onto the car body side 1 as viewed from the direction corresponding to the back of the vehicle fore-and-aft direction. Some part of the car body side 1 is hidden from view by the rigid member 40 from the back of the vehicle fore-and-aft direction. The rigid member 40 is horizontally brought into contact with and thereby welded onto the inside of the car body side 1 (interior/the right of FIG. 5) by a placement load Fb. The placement load Fb corresponds to 1 G×(weight of the rigid member 40) in the horizontal direction in this figure. The car body side 1 undergoes buckling due to the placement load Fb. The buckling has a component in the self-weight direction of the car body side 1 (the same direction as that of the arrow indicating the self-weight Fa in FIG. 1) with respect to the state of the car body side 1 in welding (the posture in welding), resulting in the cause of a deflection of the car body side 1 in the self-weight direction.

STEPs 7 to 0 in FIG. 2 are additional processing of the clamp positions on the car body side 1 for addressing such buckling. The processing of STEPs 7 to 10 is similar to that of STEP 3 to 6 described above; however, they are different in that STEPs 3 to 6 have the processing for the first settings and STEPs 7 to 10 have the processing for the second settings.

In STEP 7, the operator determines the second settings of the welding target workpiece clamped at the determined clamp positions in welding. In the second settings, the welding target workpiece is being clamped by the welding clamp at the determined clamp positions and experiencing buckling due to a placement load. Fb in the direction of placing the rigid member 40 that is a welded workpiece onto the car body side 1 that is a welding target workpiece.

In STEP 8, the simulation PC simulates the deflection amount of the welding target workpiece in the second settings. In STEP 9, the operator determines whether the welding target workpiece has a site with a deflection amount exceeding a predetermined threshold, on the basis of the simulation results from STEP 8. Although the threshold in STEP 9 is typically the same as the threshold in STEP 5, a value other than the threshold in STEP 5 may also be set while satisfying the condition that the tolerable deflection level is not exceeded.

If the determination result in STEP 9 is yes, the operator proceeds to STEP the determination result is no, the operator proceeds to STEP 11.

In STEP 10, the operator determines the site with the maximum deflection amount in the welding target workpiece as a clamp position on the welding target workpiece. After STEP 10, the operator returns to STEP 7.

In this manner, the second settings with the welding target workpiece having buckling are determined, and in the second settings, a determined clamp position is added by repeating STEPs 7 to 10 until the determination result in STEP 9 becomes no. This allows prevention of a site with a deflection amount higher than the threshold in the car body side 1 during the clamping of the car body side 1 on which the rigid member 40 is welded. When any site with a deflection amount higher than the threshold remains in the car body side 1, a determined clamp position is added sequentially to the site. If the determination result in STEP 9 becomes no, the addition of a determined clamp position is ended. This allows the number of determined clamp positions to be minimized.

In STEP 11, the operator determines all the determined clamp positions including the base clamp positions as final clamp positions. In an actual work site where the robot performs welding on a welding target workpiece, the robot clamps the welding target workpiece using the welding clamp at the final clamp positions determined in STEP 11. The robot changes the posture of the welding target workpiece to the posture determined in the first settings and then starts spot welding.

Note that the posture of the welding target workpiece in welding determined in the first settings of STEP 3 is the same as the posture of the welding target workpiece in welding determined in the second settings of STEP 7. After STEP 11, the method for positioning a welding clamp is ended.

FIG. 6 illustrates the clamp positions on the car body side 1 finally determined in response to STEP 11. The determined clamp positions when the determination result in STEP 5 is no and the repetition of STEPs 1 to 6 is ended are the hinge areas 10 to 13 and the clamp positions 21 to 26, which are 10 positions in total.

In addition, the processing in STEPs 7 to 10 adds four clamp positions 31 to 34 as determined clamp positions. More specifically, the clamp positions 31, 32 are added to the front protrusion 2, and the clamp positions 33, 34 are added to the rear protrusion 4.

Although an embodiment of the present invention has been described, the present invention is not limited to this example.

For example, STEP 6 or 10 in the above embodiment adds one clamp position at a time to the site with the maximum deflection amount or a site adjacent thereto. However, multiple sites with maximal deflection amounts may be determined at a time as clamp positions if the following three conditions are satisfied: (u1) sites have maximal deflection amounts higher than the surrounding deflection amounts, (u2) the maximal deflection amounts are higher than the above-mentioned threshold, and (u3) a determined clamp position exists between the sites with the maximal deflection amounts, or the distance between the sites with the maximal deflection amounts is a predetermined value or higher.

In STEP 6 or 10 of the above embodiment, clamp positions are determined at sites with the maximum deflection amounts; alternatively, if such sites with the maximum deflection amounts have a problem about clamping for structural reasons, clamp positions are determined at sites close to the sites with maximum deflection amounts and having no problem about clamping. However, when a site with the maximum deflection amount is in the vicinity of the edge of the welding target workpiece, a site appropriately closer to a determined clamp position from the edge may be determined as a clamp position instead of the determination of the site with the maximum deflection amount as a clamp position even if the site with the maximum deflection amount has no problem about clamping.

Determining a site appropriately closer to a determined clamp position from the edge as a clamp position is more advantageous than determining a site with the maximum deflection amount as a clamp position because the area of sites with deflection amounts each equal to or lower than the threshold is reduced in the overall welding target workpiece. Provided, however, that changing a determined clamp position allows the site with the maximum deflection amount to have a deflection amount equal to or lower than the threshold, a site other than the site with the maximum deflection amount may be determined as a clamp position.

In the above embodiment, STEP 2 is an example of the first step of the present invention, STEPs 3 to 5 are an example of the second step of the present invention, STEP 6 is an example of the third step of the present invention, STEPs 7 to 9 are an example of the fourth step of the present invention, and STEP 10 is an example of the fifth step of the present invention. The car body side 1 is an example of the first workpiece of the present invention, and the rigid member 40 horizontally welded onto the car body side 1 is an example of the second workpiece of the present invention.

INDUSTRIAL APPLICABILITY

The present invention relates to a method for positioning a suitable clamp position for supporting welding target workpieces. The present invention is applied to determining clamp positions in welding on a relatively heavy workpiece as well as a workpiece that is a heavy component of an automobile and automatically welded by a welding robot.

REFERENCE SIGNS LIST

1 Car body side (first workpiece)
10 Front upper hinge area (base clamp position)
11 Front lower hinge area (base clamp position)
12 Rear upper hinge area base clamp position)
13 Rear lower hinge area base clamp position)
21 to 26, 31 to 34 Clamp positions
40 Rigid member (second workpiece)

The invention claimed is:

1. A method for positioning a welding clamp to determine positions for clamping a welding target first workpiece by the welding clamp, the method comprising:

a first step of determining a reference clamp position on the first workpiece, the reference clamp position being included in a set of determined clamp positions;

a second step of identifying a site having a deflection larger than a predetermined deflection amount in the first workpiece under a condition that the first workpiece is clamped by the welding clamp at each clamp position included in the set of determined clamp positions; and a third step of determining the site having the deflection larger than the predetermined deflection amount as an additional clamp position, which is added to the set of determined clamp positions, wherein the second step and the third step are repeated until the second step fails to identify the site having the deflection larger than the predetermined deflection amount.

2. The method for positioning a welding clamp according to claim 1, wherein the second step identifies the site having the deflection larger than the predetermined deflection amount in the first workpiece based on whether a maximum deflection amount in the first workpiece exceeds the predetermined deflection amount, and the third step determines a site having the maximum deflection amount in the first workpiece as the additional clamp position which is added to the set of determined clamp positions.

3. The method for positioning a welding clamp according to claim 1, wherein the second step identifies the site having the deflection larger than the predetermined deflection amount in the first workpiece based on whether a maximum deflection amount in the first workpiece exceeds the predetermined deflection amount, and when a site having the maximum deflection amount in the first workpiece is a site incapable of being clamped by the welding clamp, the third step determines, as the additional clamp position which is added to the set of determined clamp positions, a site including, when distortions in the first workpiece are classified by areas in accordance with distortion amounts, a same area as the site with the maximum deflection amount, and capable of being clamped by the welding clamp in the area.

4. The method for positioning a welding clamp according to claim 1, wherein the second step identifies the site having the deflection larger than the predetermined deflection amount in the first workpiece based on whether a maximum deflection amount in the first workpiece exceeds the predetermined deflection amount, and the third step determines a site other than a site with the maximum deflection amount and having a deflection larger than the predetermined deflection amount, as the additional clamp position which is added to the set of determined clamp positions.

5. The method for positioning a welding clamp according to claim 1, further comprising:

a fourth step of, with a second workpiece to be welded onto the first workpiece placed after the first to third steps, determining settings with buckling due to a placement load in a direction of placing the second workpiece onto the first workpiece, and identifying a secondary site with a secondary deflection larger than the predetermined deflection amount in the first workpiece clamped at each clamp position included in the set of determined clamp positions; and a fifth step of determining the secondary site having the secondary deflection larger than the predetermined deflection amount as a secondary additional clamp position, which is added to the set of determined clamp positions, wherein the fourth step and the fifth step are repeated until the fourth step fails to identify the secondary site having the secondary deflection larger than the predetermined deflection amount.

6. The method for positioning a welding clamp according to claim 5, wherein the fourth step identifies the secondary site having the secondary deflection larger than the predetermined deflection amount in the first workpiece based on whether a maximum deflection amount in the first workpiece exceeds the predetermined deflection amount, and the fifth step determines a secondary site having the maximum deflection amount in the first workpiece as the secondary additional clamp position which is added to the set of determined clamp positions.

7. The method for positioning a welding clamp according to claim 5, wherein the fourth step identifies the secondary site having the secondary deflection larger than the predetermined deflection amount in the first workpiece based on whether a maximum deflection amount in the first workpiece exceeds the predetermined deflection amount, and when a site having the maximum deflection amount in the first workpiece is a site incapable of being clamped by the welding clamp, the fifth step determines, as the secondary additional clamp position which is added to the set of determined clamp positions, a site including, when distortions in the first workpiece are classified by areas in accordance with distortion amounts, a same area as the site with the maximum deflection amount, and capable of being clamped by the welding clamp in the area.

8. The method for positioning a welding clamp according to claim 5, wherein the fourth step identifies the secondary site having the secondary deflection larger than the predetermined deflection amount in the first workpiece based on whether a maximum deflection amount in the first workpiece exceeds the predetermined deflection amount, and the fifth step determines a secondary site other than a site with the maximum deflection amount and having a deflection larger than the predetermined deflection amount, as the additional clamp position which is added to the set of determined clamp positions.

* * * * *